United States Patent
Nagai et al.

(10) Patent No.: US 9,662,786 B2
(45) Date of Patent: May 30, 2017

(54) INDUSTRIAL ROBOT

(71) Applicant: Panasonic Intellectual Property Management Co., Ltd., Osaka (JP)

(72) Inventors: Takashi Nagai, Hyogo (JP); Kazunori Matsumoto, Osaka (JP); Wataru Takahashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/569,957

(22) Filed: Dec. 15, 2014

(65) Prior Publication Data

US 2015/0096401 A1    Apr. 9, 2015

Related U.S. Application Data

(63) Continuation of application No. PCT/JP2014/000106, filed on Jan. 14, 2014.

(30) Foreign Application Priority Data

Jan. 17, 2013    (JP) .................................. 2013-006012

(51) Int. Cl.
  *B25J 9/12*    (2006.01)
  *B25J 18/00*    (2006.01)
  (Continued)

(52) U.S. Cl.
  CPC .............. *B25J 9/126* (2013.01); *B25J 9/1674* (2013.01); *B25J 18/00* (2013.01); *B25J 19/005* (2013.01);
  (Continued)

(58) Field of Classification Search
  CPC ........ B25J 9/06; B25J 19/005; B25J 19/0025; B25J 19/0029
  (Continued)

(56) References Cited

U.S. PATENT DOCUMENTS 5,006,035 A * 4/1991 Nakashima .............. B25J 9/046
                                                         414/680
5,437,207 A * 8/1995 Zimmer ............... B23K 11/318
                                                         414/918
(Continued)

FOREIGN PATENT DOCUMENTS

CN    1942290 B    5/2010
EP    728559    8/1996
(Continued)

OTHER PUBLICATIONS

English Translation of Chinese Search Report dated Jul. 27, 2015 for the related Chinese Patent Application No. 201480001870.9.
(Continued)

*Primary Examiner* — Terence Boes
(74) *Attorney, Agent, or Firm* — Wenderoth, Lind & Ponack, L.L.P.

(57) ABSTRACT

An industrial robot of the present disclosure includes a manipulator, a control device for controlling the manipulator, and a connection cable that connects the manipulator to the control device. The manipulator includes a fixed base section, a first motor, a first detecting section, a power supply section, a first casing, and a first power supply cable. The first motor operates the manipulator. The first detecting section detects the state of the first motor. The power supply section supplies electric power to the first detecting section. The first casing stores the first motor and the first detecting section. The first power supply cable connects the first detecting section to the power supply section. The power supply section is disposed in the base section.

16 Claims, 3 Drawing Sheets

(51) Int. Cl.
    *B25J 19/02* (2006.01)
    *B25J 9/16* (2006.01)
    *B25J 19/00* (2006.01)

(52) U.S. Cl.
    CPC ........... *B25J 19/0025* (2013.01); *B25J 19/02* (2013.01); *Y10S 901/23* (2013.01); *Y10S 901/27* (2013.01); *Y10T 74/20311* (2015.01)

(58) Field of Classification Search
    USPC ...................................................... 74/490.02
    See application file for complete search history.

(56) References Cited

U.S. PATENT DOCUMENTS

| | | | |
|---|---|---|---|
| 5,619,111 A * | 4/1997 | Katagiri | G05B 11/32 318/105 |
| 5,986,423 A * | 11/1999 | Matsumoto | B25J 19/02 318/568.16 |
| 2006/0177295 A1* | 8/2006 | Frueh | B25J 9/046 414/695.8 |
| 2008/0260510 A1* | 10/2008 | Iwai | B25J 19/0029 414/787 |

FOREIGN PATENT DOCUMENTS

| | | |
|---|---|---|
| EP | 2 042 273 | 4/2009 |
| JP | 59-169772 U | 9/1984 |
| JP | 63-109440 U | 7/1988 |
| JP | 63-110398 | 7/1988 |
| JP | 63-110398 U | 7/1988 |
| JP | 4-141395 | 5/1992 |
| JP | 05-067490 | 3/1993 |
| JP | 08-276393 | 10/1996 |
| JP | 10-006273 | 1/1998 |
| JP | 10-058375 | 3/1998 |
| JP | 2823674 B | 11/1998 |
| JP | 2004-520953 | 7/2004 |
| JP | 2006-321026 | 11/2006 |
| JP | 2007-110796 | 4/2007 |
| JP | 2009-303402 | 12/2009 |

OTHER PUBLICATIONS

International Search Report of PCT application No. PCT/JP2014/000106 dated Feb. 18, 2014.
Extended European Search Report issued Jun. 21, 2016 in European Patent Application No. 14740762.1.

* cited by examiner

INDUSTRIAL ROBOT

BACKGROUND

1. Technical Field

The present disclosure relates to an industrial robot including an encoder and a power supply for the encoder.

2. Background Art

An industrial robot includes a manipulator, a control device for controlling an operation of the manipulator, and a connection cable connecting the manipulator to the control device. Noise in the connection cable due to extension of the connection cable presents a problem.

Generally, a conventional industrial robot is configured as shown in FIG. 3. The configuration is hereinafter described with reference to FIG. 3.

As shown in FIG. 3, industrial robot 101 includes control device 102, manipulator 103, a plurality of motors 104, a plurality of encoders 105, and connection cable 106. Motors 104 drive manipulator 103. Each encoder 105 is attached on each motor 104, and detects rotation position, angle, or speed of each motor 104. Connection cable 106 transmits, to control device 102, feedback signals output from the plurality of encoders 105.

FIG. 3 shows only components related to the present disclosure (described later). FIG. 3 shows six-axis manipulator 103, for example.

Control device 102 and manipulator 103 are interconnected via connection cable 106, and signals or information can be communicated between them. For example, electric power for encoders 105 is supplied and a driving command is transmitted from control device 102 to manipulator 103. A signal or the like related to information of each joint (axis) of manipulator 103 that has been detected by encoders 105 is transmitted from manipulator 103 to control device 102.

In conventional industrial robot 101, power supply sections 107 for encoders 105 are disposed near encoders 105 attached on motors 104 constituting manipulator 103. This configuration solves problems arising when connection cable 106 is long, for example voltage drop and noise by connection cable 106 (for example, Unexamined Japanese Patent Publication No. H10-006273).

Each power supply section 107 is formed of a printed board, and the printed board includes a constant voltage element and a filter. The constant voltage element is a power source for encoder 105, and outputs fluctuating input voltage as a constant voltage. The filter removes noise occurring between control device 102 and power supply section 107.

By disposing power supply section 107 as a printed board near encoder 105, the filter disposed in the printed board can remove noise immediately before electric power is input into encoder 105. Therefore, encoder 105 is not affected by noise occurring in connection cable 106 that connects control device 102 to manipulator 103.

The voltage drop by connection cable 106 is allowed within the fluctuation range of the input voltage of the constant voltage element. Therefore, connection cable 106 can be elongated.

In the conventional industrial robot, a battery that supplies electric power to encoder 105 when control device 102 stops and hence power supply from power supply section 107 to encoder 105 stops is disposed near power supply section 107. The battery is a standby power source used when encoder 105 stores rotation position information or the like of motor 104.

SUMMARY

A conventional industrial robot has a problem that the casing of manipulator 103 is large because power supply sections 107 for encoders 105 are disposed near motors 104.

Furthermore, power supply sections 107 are disposed in movable parts of manipulator 103, so that power supply sections 107 can be damaged due to an impact during an operation of manipulator 103 and can be damaged due to intrusion of dirt or dust.

In order to address the problem, an industrial robot of the present disclosure includes a manipulator, a control device for controlling the manipulator, and a connection cable that connects the manipulator to the control device. The manipulator includes a fixed base section, a first motor, a first detecting section, a power supply section, a first casing, and a first power supply cable. The first motor operates the manipulator. The first detecting section detects the state of the first motor. The power supply section supplies electric power to the first detecting section. The first casing stores the first motor and the first detecting section. The first power supply cable connects the first detecting section to the power supply section. The power supply section is disposed in the base section.

As discussed above, in the industrial robot of the present disclosure, the power supply section for supplying electric power to the detecting section for detecting the state of the motor is disposed in the base section of the manipulator that does not move during an operation of the manipulator. Thus, a power supply section does not need to be disposed in the casing of the manipulator, and hence the casing size of the manipulator can be reduced. The base section does not move, so that an impact during an operation of the manipulator can be prevented from damaging the power supply section.

DESCRIPTION OF EMBODIMENTS

An industrial robot in accordance with an exemplary embodiment of the present disclosure is described with reference to FIG. 1 and FIG. 2.

Exemplary Embodiment

Figure 1:
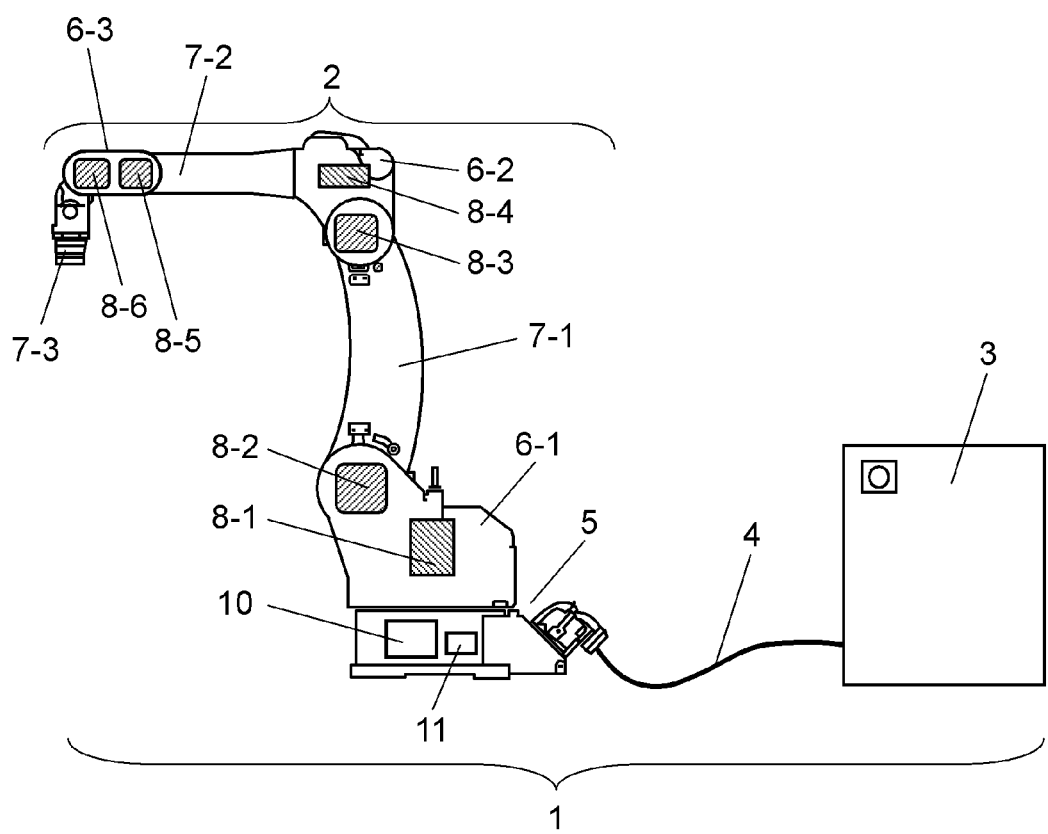
FIG. 1 is a diagram showing a schematic configuration of an industrial robot in accordance with a present exemplary embodiment.
Figure 2:
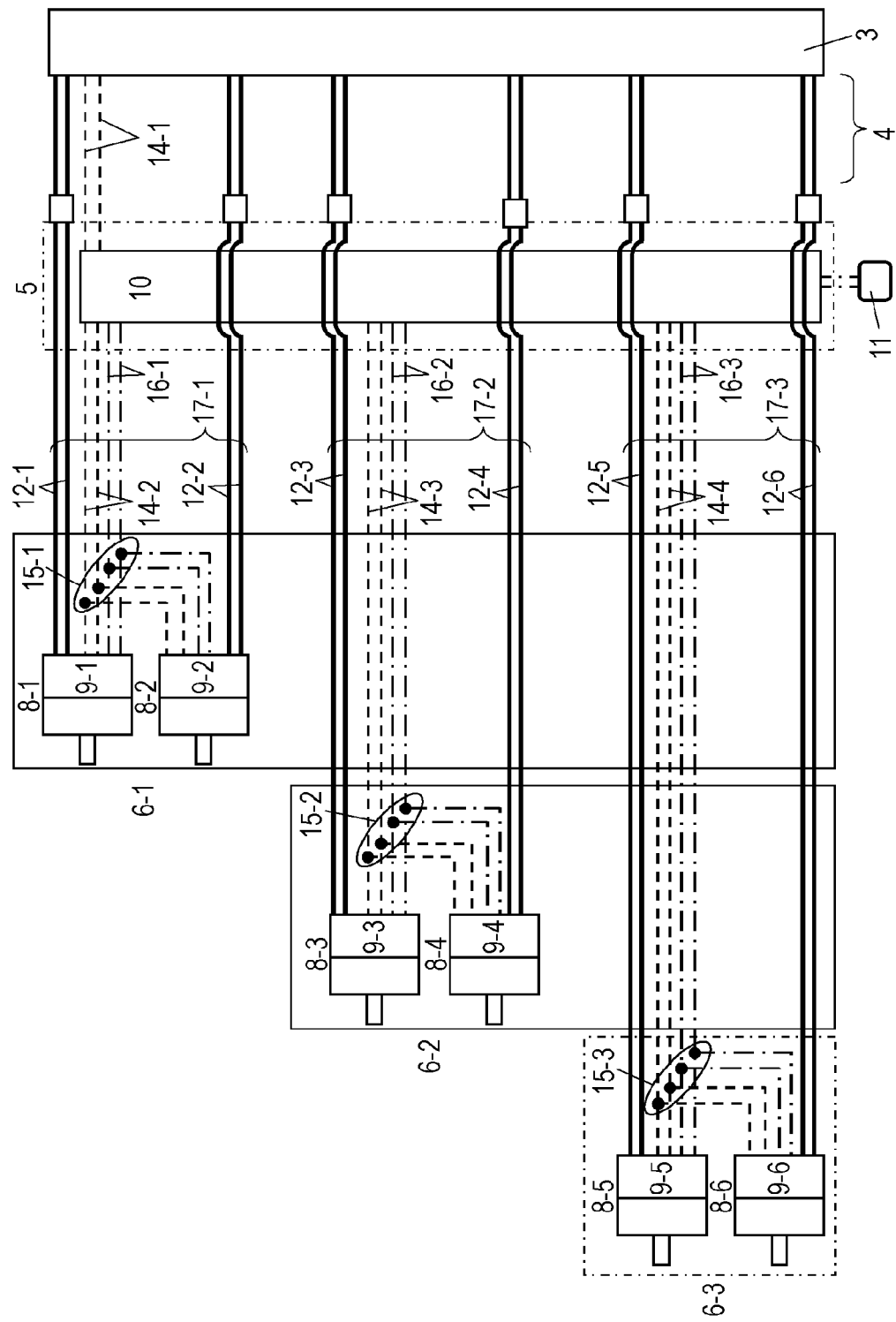
FIG. 2 is a diagram showing the connection state between a control device, an encoder, a power supply section, and a battery in accordance with the present exemplary embodiment.
Figure 3:
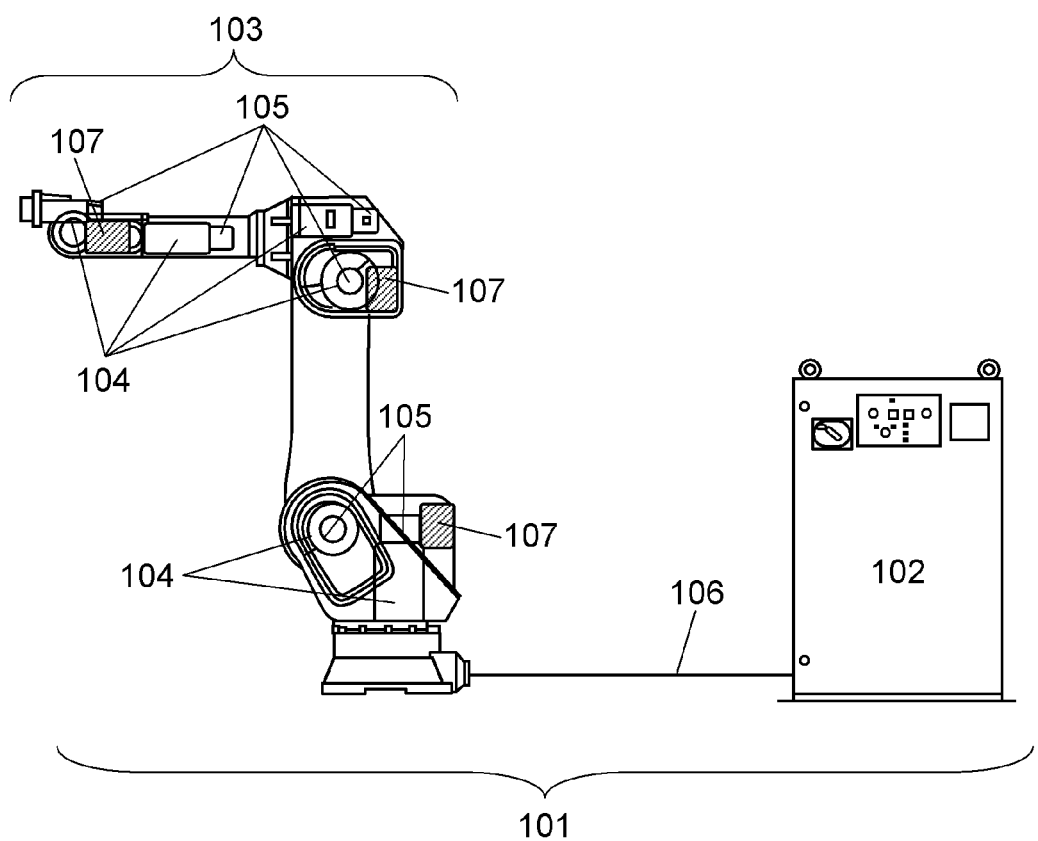
FIG. 3 is a diagram showing a schematic configuration of a conventional industrial robot.

As shown in FIG. 1 and FIG. 2, industrial robot 1 of the present exemplary embodiment includes manipulator 2, control device 3 for controlling the driving of a joint of manipulator 2, and connection cable 4 that interconnects manipulator 2 and control device 3.

Manipulator 2 includes the following elements:
six joints;
base section 5 fixed on an installation part such as a floor; and
first casing 6-1, second casing 6-2, third casing 6-3, first arm 7-1, second arm 7-2, and third arm 7-3 that are moved by driving of the joints.

Manipulator 2 includes six motors—first motor 8-1 to sixth motor 8-6—for driving respective joints. First motor 8-1 to sixth motor 8-6 include six encoders—first encoder 9-1 (first detecting section) to sixth encoder 9-6 (sixth detecting section)—for detecting the state of the motors such as rotation positions, angles, or speeds of first motor 8-1 to sixth motor 8-6, respectively. Power supply section 10 for supplying electric power to all of first encoder 9-1 to sixth encoder 9-6 is disposed in base section 5 of manipulator 2.

Power supply section 10 is connected to battery 11 that supplies electric power to each encoder when control device 3 stops and hence power supply from power supply section 10 to each encoder stops. Battery 11 is a standby power source used when first encoder 9-1 to sixth encoder 9-6 store rotation position information or the like of first motor 8-1 to sixth motor 8-6. Battery 11 is stored in a battery case that is disposed in base section 5 of manipulator 2 at a position where the battery case can be accessed, namely can be replaced, from the outside of base section 5. Conventionally, a battery each is disposed at a plurality of separate positions. In the present exemplary embodiment, however, one battery 11 is disposed in base section 5 and hence battery replacement during maintenance can be efficiently performed.

For example, power supply section 10 monitors the electric power supplied from control device 3, and, when the electric power supplied from control device 3 becomes zero, supplies electric power of battery 11 to each encoder. Power supply section 10 can charge battery 11 when the electric power is supplied from control device 3.

In the present exemplary embodiment, battery 11 is a lithium battery of a low self-discharge rate and a long life time. However, battery 11 may be another kind of primary battery or secondary battery. Battery 11 is formed of one battery or a plurality of batteries.

First motor 8-1 and second motor 8-2 are disposed in first casing 6-1. Third motor 8-3 and fourth motor 8-4 are disposed in second casing 6-2. Fifth motor 8-5 and sixth motor 8-6 are disposed in third casing 6-3. First casing 6-1 is connected to second casing 6-2 via first arm 7-1. Second casing 6-2 is connected to third casing 6-3 via second arm 7-2. Third arm 7-3 is connected to third casing 6-3.

Hereinafter, a method is described in which the rotation position, angle, or speed information of each of first motor 8-1 to sixth motor 8-6 that is detected by each of first encoder 9-1 to sixth encoder 9-6 is transmitted to control device 3.

Each of first encoder 9-1 to sixth encoder 9-6 is connected to control device 3 via each of first signal cable 12-1 to sixth signal cable 12-6.

The rotation position, angle, or speed information of first motor 8-1 that is detected by first encoder 9-1 is transmitted to control device 3 via first signal cable 12-1 passing through first casing 6-1, base section 5, and connection cable 4.

Similarly, the rotation position, angle, or speed information of second motor 8-2 that is detected by second encoder 9-2 (second detecting section) is transmitted to control device 3 via second signal cable 12-2 passing through first casing 6-1, base section 5, and connection cable 4.

Similarly, the rotation position, angle, or speed information of third motor 8-3 that is detected by third encoder 9-3 (third detecting section) is transmitted to control device 3 via third signal cable 12-3 passing through second casing 6-2, first arm 7-1, first casing 6-1, base section 5, and connection cable 4.

Similarly, the rotation position, angle, or speed information of fourth motor 8-4 that is detected by fourth encoder 9-4 (fourth detecting section) is transmitted to control device 3 via fourth signal cable 12-4 passing through second casing 6-2, first arm 7-1, first casing 6-1, base section 5, and connection cable 4.

Similarly, the rotation position, angle, or speed information of fifth motor 8-5 that is detected by fifth encoder 9-5 (fifth detecting section) is transmitted to control device 3 via fifth signal cable 12-5 passing through third casing 6-3, second arm 7-2, second casing 6-2, first arm 7-1, first casing 6-1, base section 5, and connection cable 4.

Similarly, the rotation position, angle, or speed information of sixth motor 8-6 that is detected by sixth encoder 9-6 is transmitted to control device 3 via sixth signal cable 12-6 passing through third casing 6-3, second arm 7-2, second casing 6-2, first arm 7-1, first casing 6-1, base section 5, and connection cable 4.

The present exemplary embodiment shows an example where the rotation position, angle, or speed of each motor is communicated by serial communication. Therefore, each of first signal cable 12-1 to sixth signal cable 12-6 is shown by two lines in FIG. 2. However, this communication may be parallel communication or the like. When the parallel communication is performed, each of six first signal cable 12-1 to sixth signal cable 12-6 is formed of three or more lines.

First signal cable 12-1 to sixth signal cable 12-6 may be disposed so as to pass through casings and arms, or may be disposed so as to be partially exposed out of casings and arms.

Next, a method of supplying electric power from power supply section 10 to six encoders—first encoder 9-1 to sixth encoder 9-6—is described.

To power supply section 10, electric power is supplied from control device 3 via connection cable 4. To first encoder 9-1 to sixth encoder 9-6, electric power is supplied from one power supply section 10 disposed in base section 5. Power supply section 10 is formed of a printed board, and the printed board includes a constant voltage element and a filter. The allowable input voltage of the constant voltage element fluctuates, and the output voltage thereof is constant. Therefore, even if the electric power from control device 3 undergoes voltage drop, the constant voltage element can keep the output voltage constant. The filter removes noise occurring in the path (mainly, connection cable 4) that extends from control device 3 to power supply section 10. The constant voltage element has a function of supplying electric power to first encoder 9-1 to sixth encoder 9-6.

The printed board includes a wire for supplying electric power from control device 3 to each of six encoders. In other words, in the printed board, the wire connected to control device 3 is branched depending on the number of wires that interconnect first encoder 9-1 to sixth encoder 9-6 and power supply section 10. The constant voltage element and filter may be disposed on the wire connected to control device 3, and the number of constant voltage elements and the number of filters can be reduced. A constant voltage element and filter may be disposed for each wire connected to each of first encoder 9-1 to sixth encoder 9-6. Thus, stable electric power of low noise can be supplied for each encoder. The following configuration may be employed: a constant voltage element is disposed on the wire connected to control device 3, and a filter is disposed for each wire connected to each of first encoder 9-1 to sixth encoder 9-6. The following configuration may be employed: a filter is disposed on the wire connected to control device 3, and a constant voltage element is disposed for each wire connected to each of first encoder 9-1 to sixth encoder 9-6.

Via first power supply cable 14-2, electric power is supplied from power supply section 10 in base section 5 to first encoder 9-1 and second encoder 9-2. First power supply cable 14-2 is guided to first casing 6-1 via base section 5, and branched into two cables by first branch section 15-1 in first casing 6-1. One of the two cables obtained by branching first power supply cable 14-2 is connected to first encoder 9-1, and the other is connected to second encoder 9-2.

Similarly, via second power supply cable 14-3, electric power is supplied from power supply section 10 in base section 5 to third encoder 9-3 and fourth encoder 9-4. Second power supply cable 14-3 is guided to second casing 6-2 via base section 5, first casing 6-1, and first arm 7-1, and branched into two cables by second branch section 15-2 in second casing 6-2. One of the two cables obtained by branching second power supply cable 14-3 is connected to third encoder 9-3, and the other is connected to fourth encoder 9-4.

Similarly, via third power supply cable 14-4, electric power is supplied from power supply section 10 in base section 5 to fifth encoder 9-5 and sixth encoder 9-6. Third power supply cable 14-4 is guided to third casing 6-3 via base section 5, first casing 6-1, first arm 7-1, second casing 6-2, and second arm 7-2, and branched into two cables by third branch section 15-3 in third casing 6-3. One of the two cables obtained by branching third power supply cable 14-4 is connected to fifth encoder 9-5, and the other is connected to sixth encoder 9-6.

In the present exemplary embodiment, the number of power supply sections 10 is one, so that the electric power from control device 3 is supplied to power supply section 10 through one system of main power supply cable 14-1 included in connection cable 4. Thus, connection cable 4 can be simplified comparing with conventional connection cable 4 including a plurality of systems of power supply cables. In other words, conventionally, a plurality of power supply cables corresponding to a plurality of power supply sections is required. In the present exemplary embodiment, however, the number of power supply cables can be made smaller than that in the conventional art.

Next, a method of supplying electric power from battery 11 to six encoders—first encoder 9-1 to sixth encoder 9-6—is described.

Battery 11 is connected to the printed board of power supply section 10 in base section 5. The printed board includes a wire for supplying electric power from battery 11 to each of six encoders. In other words, in the printed board, the wire connected to battery 11 is branched depending on the number of wires that interconnect first encoder 9-1 to sixth encoder 9-6 and power supply section 10. The constant voltage element and filter may be disposed on the wire connected to battery 11, and the number of constant voltage elements and the number of filters can be reduced. A constant voltage element and filter may be disposed for each wire connected to each of first encoder 9-1 to sixth encoder 9-6. Thus, stable electric power of low noise can be supplied for each encoder. The following configuration may be employed: a constant voltage element is disposed on the wire connected to battery 11, and a filter is disposed for each wire connected to each of first encoder 9-1 to sixth encoder 9-6. The following configuration may be employed: a filter is disposed on the wire connected to battery 11, and a constant voltage element is disposed for each wire connected to each of first encoder 9-1 to sixth encoder 9-6.

Via first battery cable 16-1, electric power is supplied from battery 11 in base section 5 to first encoder 9-1 and second encoder 9-2. First battery cable 16-1 is guided to first casing 6-1 via base section 5, and branched into two cables by first branch section 15-1 in first casing 6-1. One of the two cables obtained by branching first battery cable 16-1 is connected to first encoder 9-1, and the other is connected to second encoder 9-2.

Similarly, via second battery cable 16-2, electric power is supplied from battery 11 in base section 5 to third encoder 9-3 and fourth encoder 9-4. Second battery cable 16-2 is guided to second casing 6-2 via base section 5, first casing 6-1, and first arm 7-1, and branched into two cables by second branch section 15-2 in second casing 6-2. One of the two cables obtained by branching second battery cable 16-2 is connected to third encoder 9-3, and the other is connected to fourth encoder 9-4.

Similarly, via third battery cable 16-3, electric power is supplied from battery 11 in base section 5 to fifth encoder 9-5 and sixth encoder 9-6. Third battery cable 16-3 is guided to third casing 6-3 via base section 5, first casing 6-1, first arm 7-1, second casing 6-2, and second arm 7-2, and branched into two cables by third branch section 15-3 in third casing 6-3. One of the two cables obtained by branching third battery cable 16-3 is connected to fifth encoder 9-5, and the other is connected to sixth encoder 9-6.

The branching method of the three branch sections—first branch section 15-1 to third branch section 15-3—is considered to be a method of branching a cable with a connector or solder, or a method of disposing a printed board for branch. The branching method of the three branch sections—first branch section 15-1 to third branch section 15-3—is selected appropriately depending on the space or the like for first casing 6-1 to third casing 6-3.

The following configuration may be employed: first signal cable 12-1, second signal cable 12-2, first power supply cable 14-2, and first battery cable 16-1 are combined into first composite cable 17-1 having eight cores and a shield, and first composite cable 17-1 interconnects base section 5 and first casing 6-1.

Similarly, the following configuration may be employed: third signal cable 12-3, fourth signal cable 12-4, second power supply cable 14-3, and second battery cable 16-2 are combined into a second composite cable 17-2 having eight cores and a shield, and second composite cable 17-2 interconnects base section 5 and second casing 6-2 via first casing 6-1 and first arm 7-1.

Similarly, the following configuration may be employed: fifth signal cable 12-5, sixth signal cable 12-6, third power supply cable 14-4, and third battery cable 16-3 are combined into third composite cable 17-3 having eight cores and a shield, and third composite cable 17-3 interconnects base section 5 and third casing 6-3 via first casing 6-1, first arm 7-1, second casing 6-2, and second arm 7-2.

Thus, the abrasion resistance of cables can be improved by using first composite cable 17-1 to third composite cable 17-3. By using a composite cable, a plurality of cables can be combined into one cable. Thus, the cross section of the cable is decreased, and the cabling in manipulator 2 can be simplified. By using a composite cable, the shield can prevent noise from causing malfunction.

Preferably, the three composite cables—first composite cable 17-1 to third composite cable 17-3—are bend cables including ETFE (ethylene tetrafluoroethylene copolymer) as an insulator. Thus, a bending operation of manipulator 2 can be prevented from disconnecting the cable.

Each of power supply cables 14-2 to 14-4 and each of battery cables 16-1 to 16-3 are commonly connected to the motors for two axes disposed in each casing, and are branched in the casing. Thus, the number of power supply cables and the number of battery cables can be reduced.

The printed board may be configured so that switching between a wire connected to control device 3 and a wire connected to battery 11 is performed with a switch. Thus, whether the power to power supply section 10 is supplied from control device 3 or battery 11, the constant voltage element and filter in the printed board can be shared. Thus, the power supply cable and battery cable can be shared. As a result, the number of wires in the printed board can be significantly reduced, and one of the battery cable and the power supply cable is not required.

In the industrial robot of the present exemplary embodiment, noise is removed by the effect of the filter in the printed board of power supply section 10 disposed in base section 5 of manipulator 2. Therefore, the industrial robot is not affected by the noise of connection cable 4.

Due to the shielding effect of first composite cable 17-1 to third composite cable 17-3 having a shield, the cables between encoders 9 and power supply section 10 are not affected by noise.

The voltage drop of the electric power supplied from control device 3 to power supply section 10 that depends on the length of connection cable 4 is allowed within the fluctuation range of the input voltage of the constant voltage element. Therefore, connection cable 4 can be elongated.

In the industrial robot of the present exemplary embodiment, power supply section 10 and battery 11 can constitute manipulator 2 when they are disposed only in base section 5. Therefore, differently from the conventional industrial robot, power supply section 10 and battery 11 do not need to be disposed in all of first casing 6-1 to third casing 6-3. As a result, in the industrial robot of the present exemplary embodiment, the sizes of first casing 6-1 to third casing 6-3 for storing first motor 8-1 to sixth motor 8-6 can be reduced.

In the industrial robot of the present exemplary embodiment, battery 11 is disposed at a position accessible from the outside of base section 5. Therefore, time for battery replacement during maintenance can be made shorter than that when a plurality of batteries 11 is disposed separately as in the conventional industrial robot.

Base section 5 of the industrial robot of the present exemplary embodiment is not movable, so that the degree of freedom in shape is high, it is easy to secure a disposing space for power supply section 10 and battery 11, and the design constraint is reduced advantageously. Furthermore, base section 5 is not movable, so that the possibility that an impact during an operation of manipulator 2 causes power supply section 10 and battery 11 to be damaged is reduced.

One power supply section 10 is disposed for power supply cable 14-1 between manipulator 2 and control device 3. Therefore, also when manipulator 2 includes a plurality of encoders, one system of power supply cable can be employed as the power supply cable input to power supply section 10, and connection cable 4 can be simplified.

An industrial robot of the present disclosure has noise immunity, high maintainability, and a compact casing. The industrial robot can be applied more extensively as an automatic device of a production facility, and is industrially useful.

What is claimed is:
1. An industrial robot comprising:
a manipulator;
a control device for controlling the manipulator; and
a connection cable connecting the manipulator to the control device, wherein the manipulator includes:
a fixed base section;
a first motor for operating the manipulator;
a first detecting section for detecting a state of the first motor;
a second detecting section;
a third detecting section;
a power supply section for supplying electric power to each of the first detecting section, the second detecting section, and the third detecting section;
a first casing for storing the first motor and the first detecting section;
a second casing;
a third casing;
a first power supply cable connecting the first detecting section to the power supply section;
a second power supply cable connecting the second detecting section to the power supply section; and
a third power supply cable connecting the third detecting section to the power supply section,
wherein the power supply section is disposed in the fixed base section,
wherein the connection cable includes one system of a main power supply cable connecting the control device to the power supply section, and
wherein the power supply section receives, only via the one system of the main power supply cable, the electric power supplied to each of the first detecting section, the second detecting section, and the third detecting section.

2. The industrial robot of claim 1, wherein
the battery is disposed at a position where the battery is replaceable in the fixed base section.

3. The industrial robot of claim 1, further comprising:
a first signal cable connecting the control device to the first detecting section via the fixed base section,
wherein the first power supply cable and the first signal cable are combined into one cable between the first casing and the fixed base section.

4. The industrial robot of claim 1, further comprising:
a second motor stored in the first casing and configured to operate the manipulator, wherein
the second detecting section is stored in the first casing and configured to detect a state of the second motor, and
the first power supply cable is branched in the first casing and is connected to the second detecting section.

5. The industrial robot of claim 4, further comprising:
a first signal cable connecting the control device to the first detecting section via the fixed base section; and
a second signal cable connecting the control device to the second detecting section via the fixed base section,
wherein the first power supply cable, the first signal cable, and the second signal cable are combined into one cable between the first casing and the fixed base section.

6. The industrial robot of claim 1, wherein
the power supply section includes a constant voltage element whose output voltage is constant, and a filter for removing noise.

7. The industrial robot of claim 1, wherein
the first power supply cable is guided to the first casing via the fixed base section,
the second power supply cable is guided to the second casing via at least the fixed base section and the first casing, and the third power supply cable is guided to the third casing via at least the fixed base section, the first casing, and the second casing.

8. The industrial robot of claim 7, further comprising:
a second motor stored in the first casing and configured to operate the manipulator, wherein
the second detecting section is stored in the first casing and configured to detect a state of the second motor.

9. The industrial robot of claim 8, wherein
the first power supply cable is branched into two first cables,
one of the two first cables is connected, in the first casing, to the first detecting section, and
the other of the two first cables is connected, in the first casing, to the second detecting section.

10. The industrial robot of claim 9, further comprising:
a third motor stored in the second casing and configured to operate the manipulator, wherein
the third detecting section is stored in the second casing and configured to detect a state of the third motor.

11. The industrial robot of claim 10, further comprising:
a fourth motor stored in the second casing and configured to operate the manipulator; and
a fourth detecting section stored in the second casing and configured to detect a state of the fourth motor.

12. The industrial robot of claim 11, wherein
the second power supply cable is branched into two second cables,
one of the two second cables is connected, in the second casing, to the third detecting section, and
the other of the two second cables is connected, in the second casing, to the fourth detecting section.

13. The industrial robot of claim 12, further comprising:
a fifth motor stored in the third casing and configured to operate the manipulator; and
a fifth detecting section stored in the third casing and configured to detect a state of the fifth motor.

14. The industrial robot of claim 13, further comprising:
a sixth motor stored in the third casing and configured to operate the manipulator; and
a sixth detecting section stored in the third casing and configured to detect a state of the sixth motor.

15. The industrial robot of claim 14, wherein
the third power supply cable is branched into two third cables,
one of the two third cables is connected, in the third casing, to the fifth detecting section, and
the other of the two third cables is connected, in the third casing, to the sixth detecting section.

16. The industrial robot of claim 1, further comprising:
a battery disposed in the base section and connected to the power supply section.

* * * * *